United States Patent
Liffers et al.

(10) Patent No.: US 7,013,601 B2
(45) Date of Patent: Mar. 21, 2006

(54) PLANT CONTAINER WITH HANGER

(75) Inventors: Steven W. Liffers, Seaford, DE (US); James A. Kollock, Millsboro, DE (US); Joseph A. Kollock, III, Milford, DE (US); Charles Eibler, Milltown, NJ (US)

(73) Assignee: Coastal Planters, LLC, Milltown, NJ (US)

( * ) Notice: Subject to any disclaimer, the term of this patent is extended or adjusted under 35 U.S.C. 154(b) by 0 days.

(21) Appl. No.: 10/896,425

(22) Filed: Jul. 22, 2004

(65) Prior Publication Data

US 2006/0032130 A1    Feb. 16, 2006

(51) Int. Cl.
    *A01G 9/02* (2006.01)
(52) U.S. Cl. ........................................ 47/67
(58) Field of Classification Search .................. 47/67; 70/430; 211/181.1; 248/318, 322, 33; D6/113, D6/513, 55; D8/373, 367; D11/151, 156, D11/14; D26/173
    See application file for complete search history.

(56) References Cited

U.S. PATENT DOCUMENTS

| | | | |
|---|---|---|---|
| 3,149,385 A * | 9/1964 | Beekenkamp | 24/101 R |
| 4,084,779 A | 4/1978 | Moineau | |
| 4,138,803 A * | 2/1979 | Sherlock | 47/67 |
| 4,147,320 A | 4/1979 | Biedebach | |
| 4,170,089 A | 10/1979 | Smrt | |
| 4,235,407 A | 11/1980 | Haas | |
| 4,440,371 A | 4/1984 | Wijsman | |
| 4,622,776 A * | 11/1986 | Pfaff | 47/67 |
| 4,658,540 A * | 4/1987 | Hougard | 47/67 |
| 4,744,171 A * | 5/1988 | Hilliard | 47/67 |
| 4,877,210 A | 10/1989 | Missalla | |
| 5,779,210 A | 7/1998 | Canson | |
| 5,836,109 A * | 11/1998 | Kunz et al. | 47/67 |
| 5,870,856 A | 2/1999 | Friend | |
| 5,941,019 A | 8/1999 | Guarriello, Sr. | |

* cited by examiner

Primary Examiner—Francis T. Palo
(74) Attorney, Agent, or Firm—Adams Evans P.A.

(57) ABSTRACT

A container assembly including a pot and a hanger for suspending the pot. The pot has a sidewall, a bottom wall, and an open top defined by an upper rim of the sidewall. At least three spaced-apart openings are formed in the rim of the pot. The hanger includes a suspension device for attachment to the support. At least three elongate strands are carried by respective first ends thereof on the suspension device. At least three fasteners are carried on a respective end of the three strands. Each of the fasteners include an enlarged head for being received by means of an interference fit in respective ones of the openings, whereby the hanger suspends the pot from the support.

14 Claims, 6 Drawing Sheets

PLANT CONTAINER WITH HANGER

TECHNICAL FIELD AND BACKGROUND OF THE INVENTION

This invention relates generally to a container, and more specifically, to a plant pot and a hanger by which the pot can be suspended.

Containers such as plant pots capable of being suspended from for example, a porch, are well known in the art. For example, U.S. Pat. No. 5,870,856 to Friend discloses a flower container with an optional hanger assembly. The hanger assembly includes a plurality of legs, each with an end having a circular slot or recess. One end of each leg is positioned within a respective one of a plurality of keyhole slots positioned on a top molding of the flower container. The legs are then slid into a narrower portion of the keyhole openings to secure the hanger assembly to the flower container. The remaining circular shaped opening is filled by a snap or plug.

U.S. Pat. No. 4,877,210 to Missalla discloses a pot hanger. The pot hanger includes a plurality of wires attached to a hook. The wires include a quick attachment device positioned on the free ends of the wires for being inserted into an opening around a periphery of the pot. The quick attachment device includes a finger joined to the wire at an acute angle by a loop. The finger is compressed to allow the quick attachment device to protrude through the openings in the periphery of the pot. Once the quick attachment device has protruded through the openings, the finger is released to allow the finger to engage a bottom surface of the periphery and securing the hanger to the pot.

U.S. Pat. No. 4,744,171 to Hilliard discloses a hanging pot suspension system. The hanger includes a hook attached to a plurality of wire strand connectors. The terminal ends of the strands include a protuberance or eyelet for engaging the pot. The hanger is attached to the pot by sliding the eyelets through a T-shaped slot positioned on an upper surface of an annular rim.

While these containers all include a hanger, they do not disclose a hanger that is interlocked with the container by pushing a fastener positioned on the ends of the hanger into a hole on an upper surface of a rim of the container. In addition, they do not disclose a fastener that interlocks the hanger to the rim and covers the opening without the need to use additional covers.

Accordingly, there is a need for a container with a hanger that can be securely fastened to the container, as well as, provide a cover for the openings in the rim of the container.

SUMMARY OF THE INVENTION

Therefore, it is an object of the invention to provide a container with an interlocking hanger that is securely fastened to the container.

It is another object of the invention to provide a container with a hanger that has a fastener with a shape similar to a hole in the container.

It is another object of the invention to provide a container with a hanger that includes a cover positioned above a fastener for covering a hole in the container.

It is another object of the invention to provide a container with a hanger that has a fastener that easily snaps into a hole and provides an interference fit.

These and other objects of the present invention are achieved in the preferred embodiments disclosed below by providing a container assembly including a pot having a sidewall, a bottom wall, and an open top defined by an upper rim of the sidewall; at least three spaced-apart openings formed in the rim; and a hanger for suspending the pot from a support. The hanger including a suspension device for attachment to the support; at least three elongate strands carried by respective first ends thereof on the suspension device; and at least three fasteners carried on a respective end of the three strands, each of the fasteners including an enlarged head for being received by means of an interference fit in respective ones of the openings, whereby the hanger suspends the pot from the support.

According to another preferred embodiment of the invention, the head defines an arrow-shape.

According to another preferred embodiment of the invention, the rim includes a plurality of reinforcing walls formed on an underside of the rim adjacent to each of the respective openings.

According to another preferred embodiment of the invention, at least two of the plurality of reinforcing walls adjacent to each respective opening extend perpendicular to and between an inside edge and an outside edge of the rim.

According to another preferred embodiment of the invention, each of the respective fasteners further include a cover for covering a respective opening, the cover being positioned at a height above the head substantially equal to a thickness of the rim for allowing the fastener to engage the rim.

According to another preferred embodiment of the invention, the openings are rectangular.

According to another preferred embodiment of the invention, a container assembly including a pot having a sidewall, a bottom wall, and an open top defined by an upper rim of the sidewall; at least three spaced-apart rectangular openings formed in the rim; and a hanger for suspending the pot from a support. The hanger including a hook for attachment to the support; at least three elongate strands carried by respective first ends thereof on the hook; and at least three fasteners carried on a respective end of the three strands, each of the fasteners including an enlarged head for being received by means of an interference fit in respective ones of the openings, whereby the hanger suspends the pot from the support.

According to another preferred embodiment of the invention, a container assembly including a pot having a sidewall, a bottom wall, and an open top defined by an upper rim of the sidewall, the rim having a plurality of reinforcing walls on an underside of the rim; at least three spaced-apart rectangular openings formed in the rim, the reinforcing walls forming a box around each of the respective openings for adding strength and preventing the openings from deforming; and a hanger for suspending the pot from a support. The hanger including a hook for attachment to the support; at least three elongate strands carried by respective first ends thereof on the hook; and at least three fasteners carried on a respective end of the three strands, each of the fasteners including an arrow-shaped head for being received by means of an interference fit in a respective ones of the openings and a cover for, whereby the hanger suspends the pot from the support.

According to another preferred embodiment of the invention, at least two of the reinforcing walls forming the box around each respective opening extend perpendicular to and between an inside edge and an outside edge of the rim.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
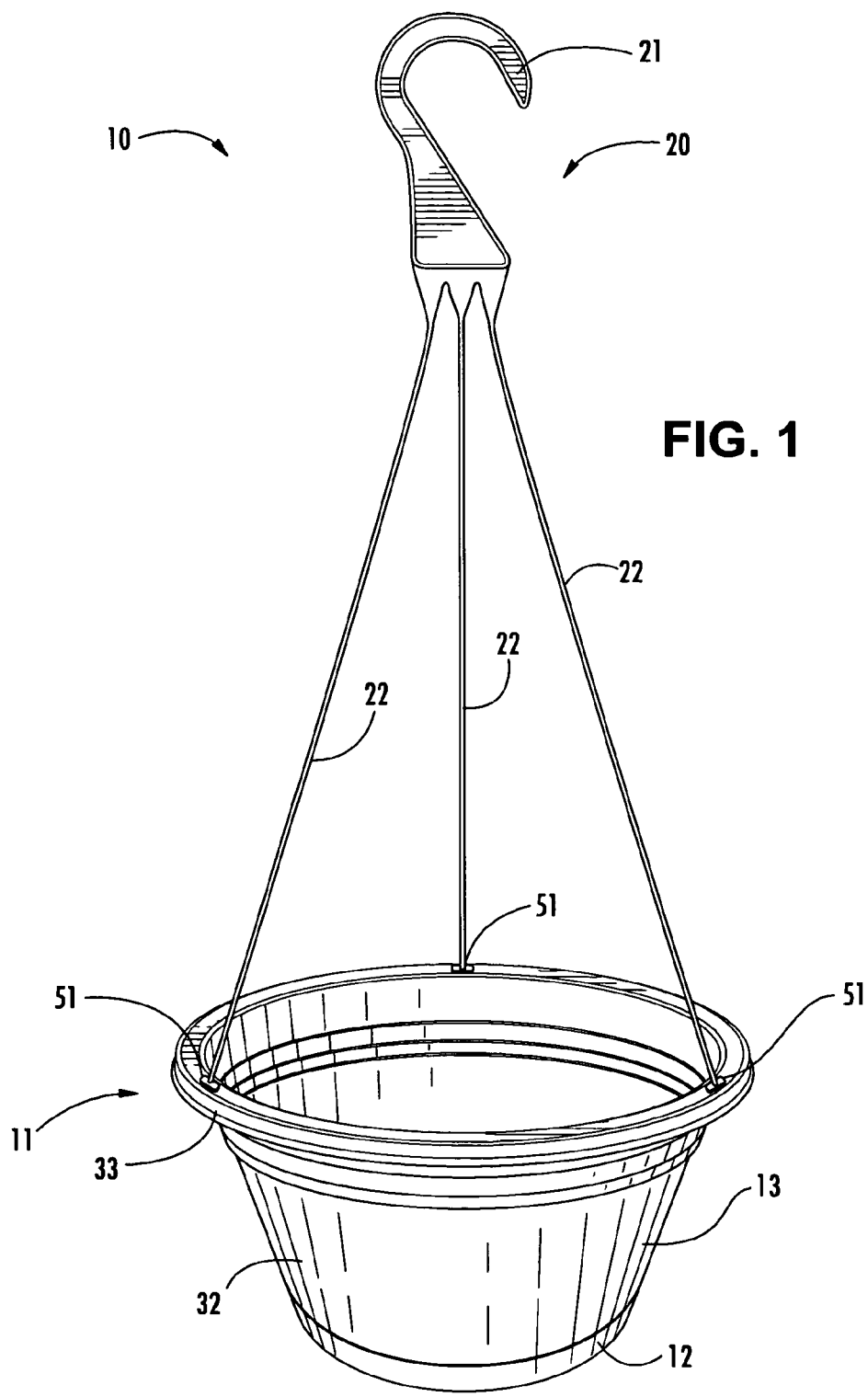
FIG. 1 shows a perspective view of a plant pot, base, and hanger according to an embodiment of the invention.
Figure 2:
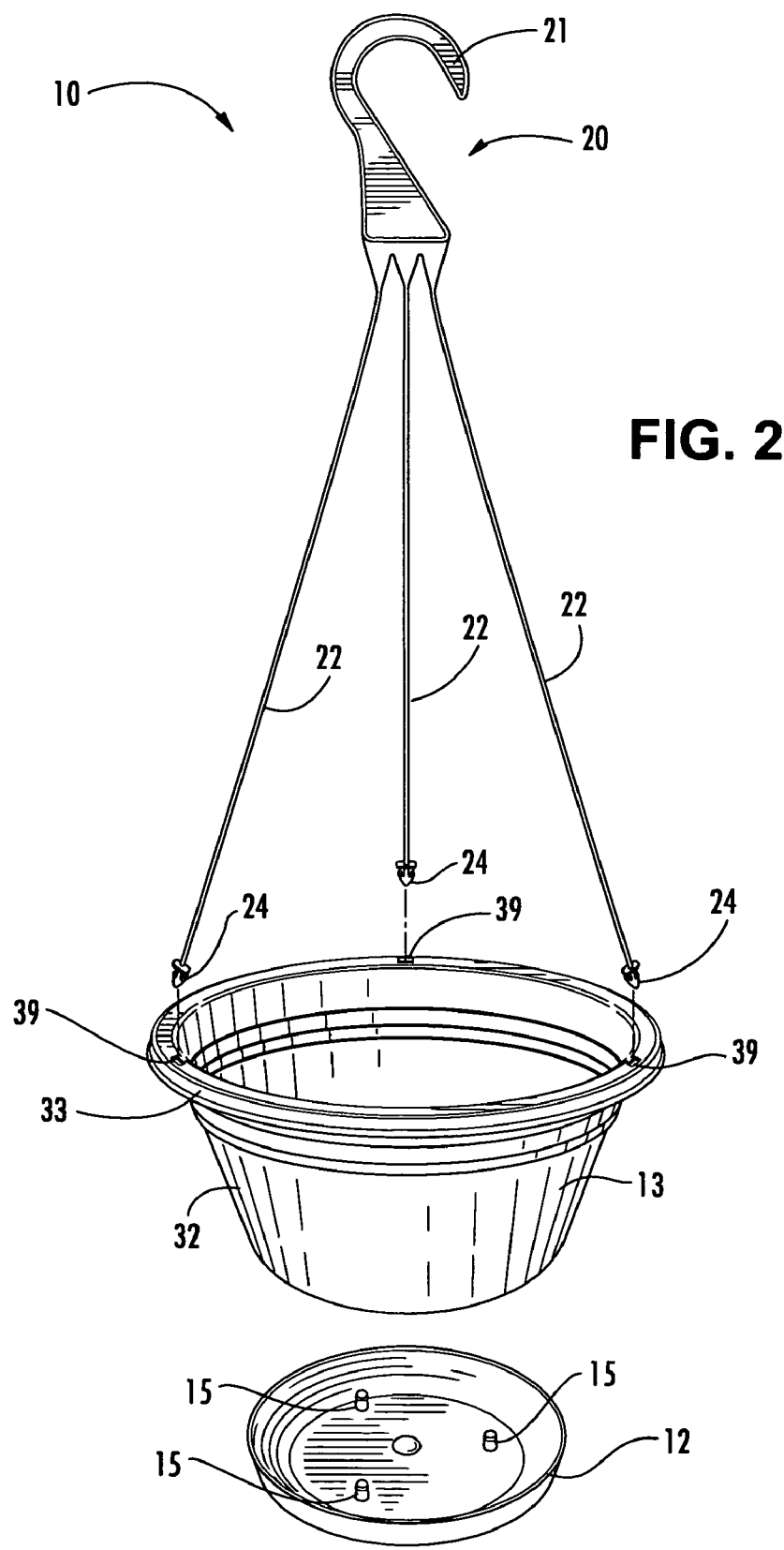
FIG. 2 is an exploded view of the pot, base, and hanger.

Referring now specifically to the drawings, a container with an attached hanger of the present invention is illustrated in FIGS. 1 and 2 and shown generally at reference numeral 10.

The container 11 includes a base 12 and a plant pot 13 interlocked together by locking openings 14 positioned on the pot 13 and complementary male projections 15 positioned on the base 12. However, the invention described and claimed herein is not limited to a container having a particular shape, or having an interlocked base.

The hanger 20 is attached to the container 11 to allow the container 11 to be suspended. The hanger 20 includes a suspension device such as a hook 21 and a plurality of elongate strands 22 attached to or integrally-formed with the hook 21. The hanger 20 is preferably made of plastic, however, any suitable material for suspending the container 11 may be used. Additionally, the hanger may be integrally formed by molding, stamping, or any other suitable fabrication method. The strands 22 each include a fastener 24 attached to a respective terminal end for attaching the hanger 20 to the container 11.

Figure 3:
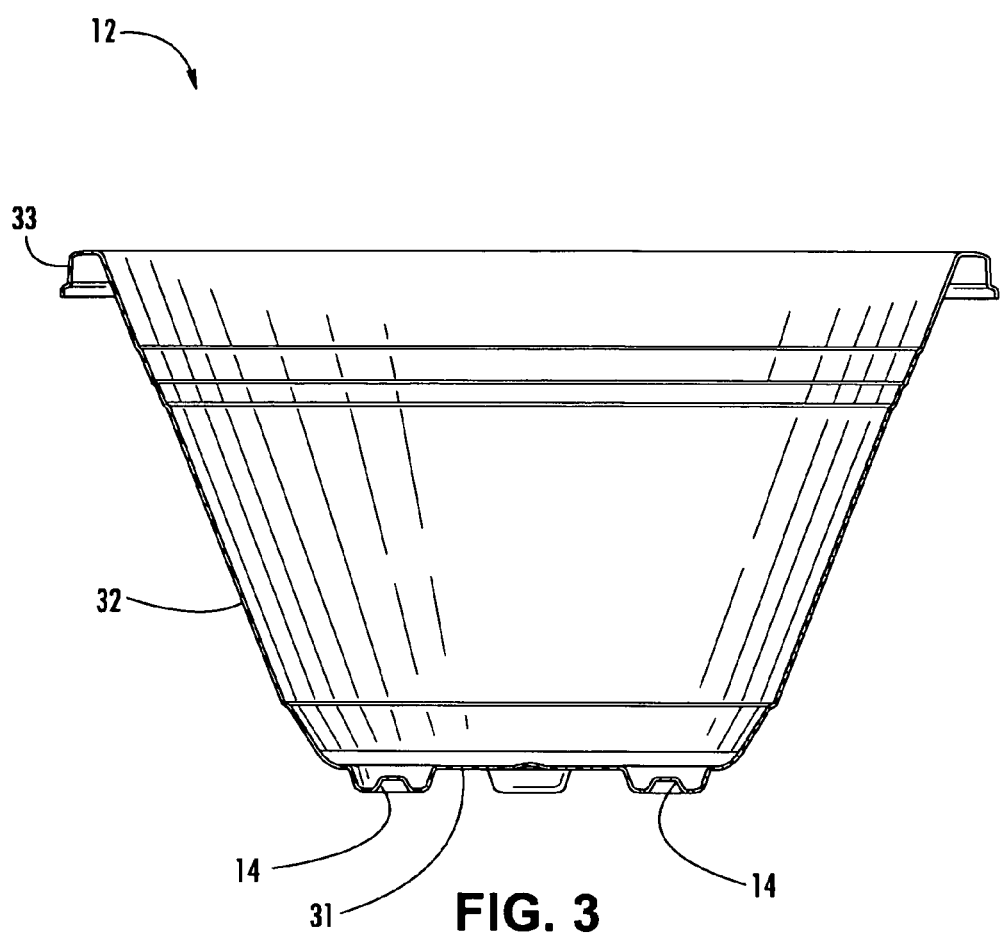
FIG. 3 is a vertical cross-section of the pot.
Figure 4:
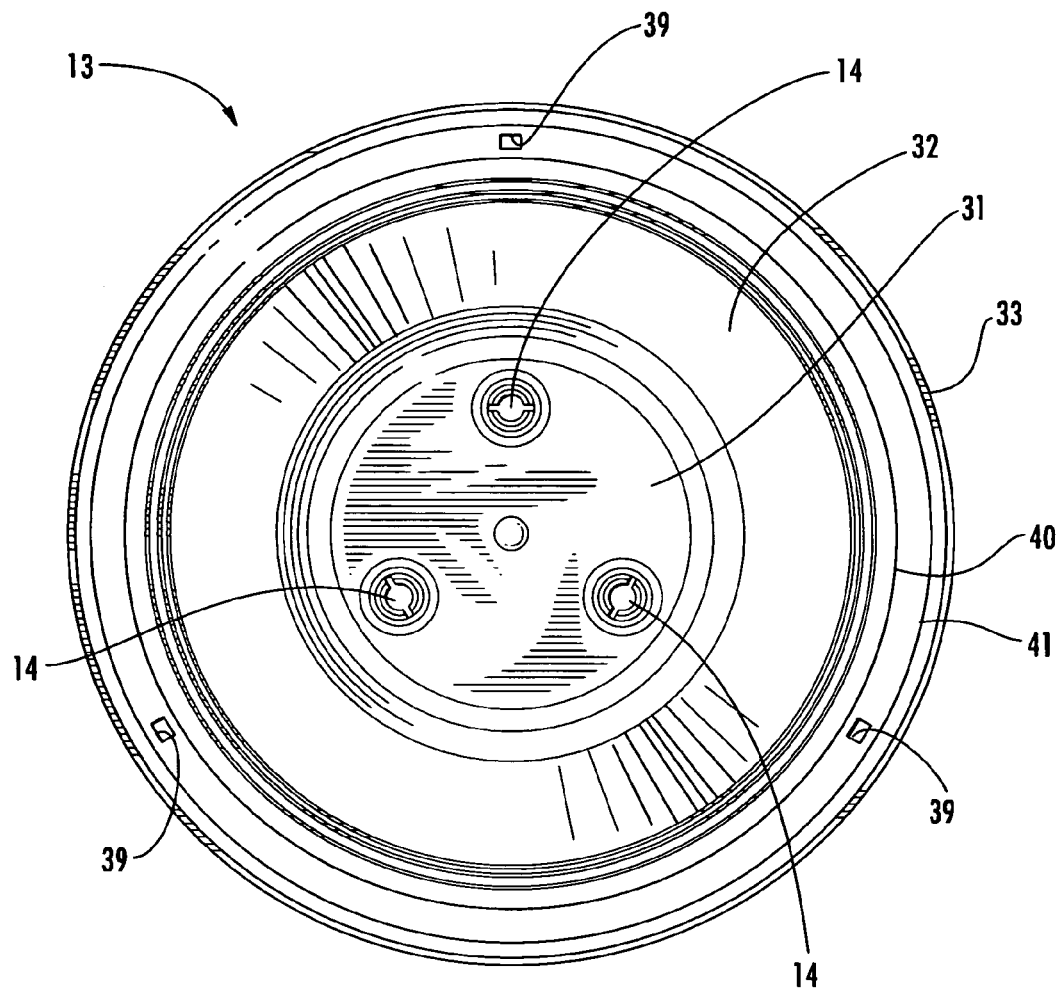
FIG. 4 is a top plan view of the pot.
Figure 5:
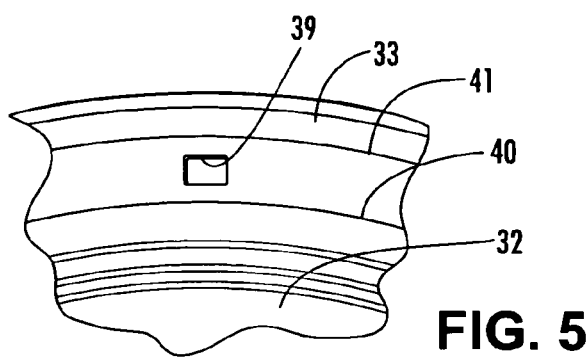
FIG. 5 is a fragmentary view of the pot in FIG. 4 showing one of the hanger openings on the rim of the pot.

Referring to FIGS. 3–5, the pot 13 has an integrally-formed bottom wall 31, a tapered sidewall 32, and a rim 33. The rim 33 includes a plurality of spaced-apart openings 39 for receiving a respective one of the complementary fasteners 24.

Figure 6:
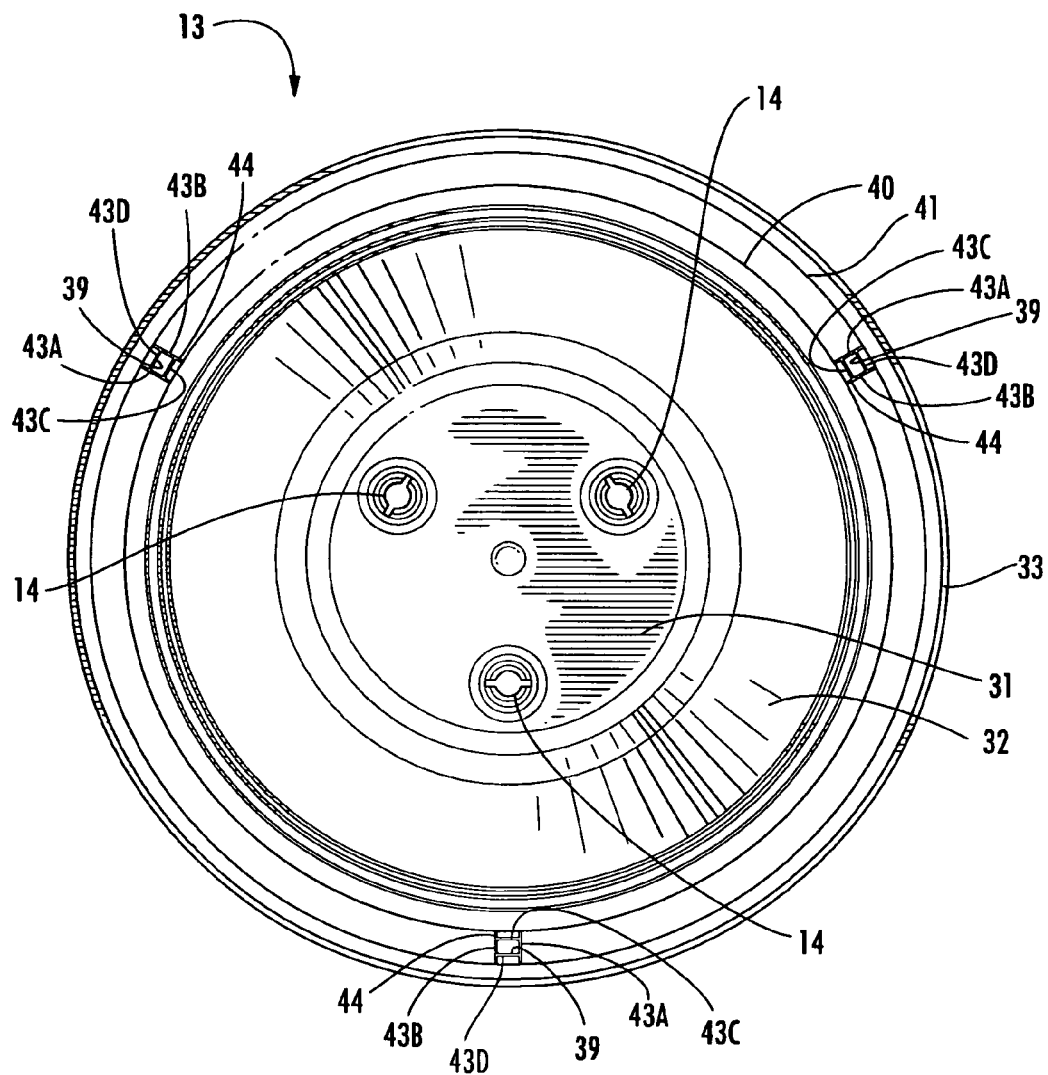
FIG. 6 is a bottom plan view of the pot.
Figure 7:
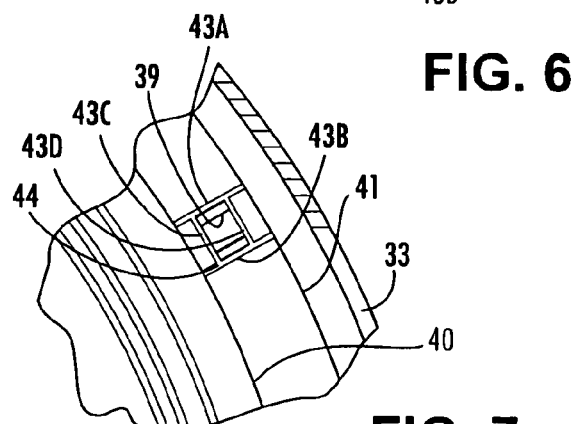
FIG. 7 is an enlarged fragmentary view of the pot rim and one of the hanger openings.

Referring to FIGS. 6 and 7, the rim 33 includes a plurality of reinforcement wall segments 43A, 43B, 43C, and 43D formed on an underside of the rim 33 and positioned adjacent to each of the openings 39. The wall segments 43A, 43B, 43C, and 43D add strength to the openings 39 and prevent the openings 39 from deforming and releasing the fasteners 24 of the hanger 20 under heavy loads.

Wall segments 43A and 43B are spaced-apart and parallel to each other, and are positioned perpendicular to and between the inside edge 40 and outside edge 41 of the rim 33. Wall segments 43C and 43D are spaced-apart and parallel to each other, and are positioned perpendicular to and between wall segments 43A and 43B to form a box 44 around each of the openings 39.

Figure 8:
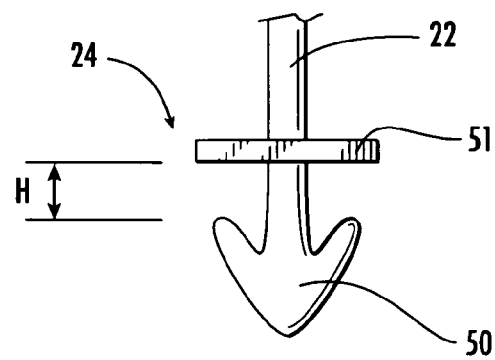
FIG. 8 is an enlarged fragmentary view of a fastener of the hanger.
Figure 9:
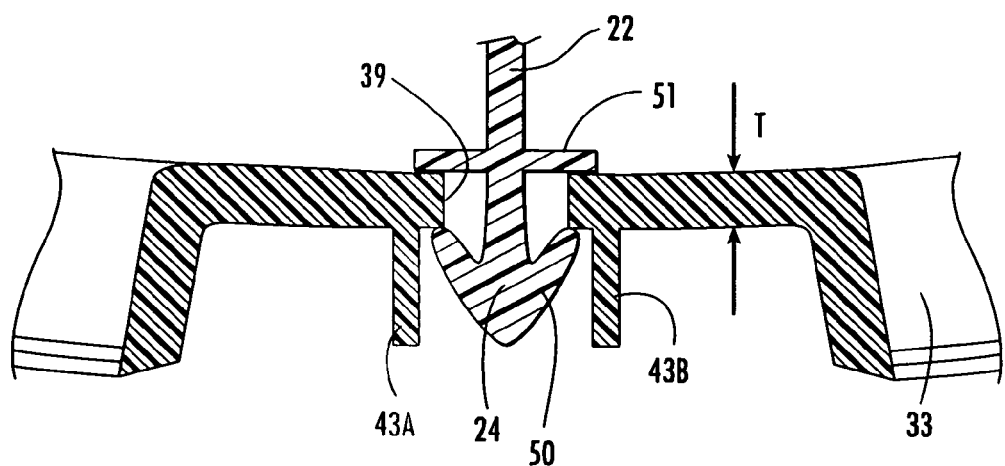
FIG. 9 is a fragmentary vertical cross-section showing the fastener engaged with the hanger opening.

Referring to FIGS. 8 and 9, each of the fasteners 24 include an arrow-shaped, enlarged head 50, and a cover 51. The head 50 allows the fastener 24 to be easily inserted into the opening 39.

The cover 51 is formed in relation to the head 50 at a height "H" and has a shape and area sufficient to cover a width of the opening 39. The height "H" is slightly larger than the thickness "T" of the rim 33 to allow the head 50 to engage the underside of the rim 33 adjacent to the opening 39.

The hanger 20 is installed by inserting the fasteners 24 into the openings 39. The head 50 is sized and has sufficient "give" to allow it to be forced through the opening 39. The head 50 returns to a normal position and engages the underside of the rim 33, providing an interference fit, as shown in FIG. 9.

A container with an attached hanger is described above. Various details of the invention may be changed without departing from its scope. Furthermore, the foregoing description of the preferred embodiments of the invention and the best mode for practicing the invention are provided for the purpose of illustration only and not for the purpose of limitation, the invention being identified in the claims.

We claim:

1. A container assembly, comprising:
   (a) a pot having a sidewall, a bottom wall, and an open top defined by an upper rim of the sidewall;
   (b) at least three spaced-apart openings formed in the rim; and
   (c) a hanger for suspending the pot from a support, the hanger comprising:
      (i) a suspension device for attachment to the support;
      (ii) at least three elongate strands carried by respective first ends thereof on the suspension device; and
      (iii) at least three fasteners carried on a respective end of the three strands, each of the fasteners including an enlarged head having at least two independent yieldable members, wherein the fasteners are moveable between a compressed state where the fasteners are capable of passing through respective ones of the openings and an expanded state where the fasteners interfere with respective ones of the openings to prevent withdrawal therefrom.

2. The container assembly according to claim 1, wherein the at least two independent yieldable members extend outwardly at an angle to define an arrow-shaped head.

3. The container assembly according to claim 1, wherein the rim includes a plurality of reinforcing walls formed on an underside of the rim adjacent to each of the respective openings for preventing the openings from deforming.

4. The container assembly according to claim 3, wherein at least two of the plurality of reinforcing walls adjacent to each respective opening extend perpendicular to and between an inside edge and an outside edge of the rim.

5. The container assembly according to claim 1, wherein each of the respective fasteners further include a cover for covering a respective opening, the cover being positioned at a height above the head substantially equal to a thickness of the rim so as to allow the fastener to engage the rim and maintain the head in contact with an underside of the rim.

6. The container assembly according to claim 1, wherein the openings are rectangular.

7. A container assembly, comprising:
   (a) a pot having a sidewall, a bottom wall, and an open top defined by an upper rim of the sidewall;
   (b) at least three spaced-apart rectangular openings formed in the rim; and (c) a hanger for suspending the pot from a support, the hanger comprising:
   (i) a hook for attachment to the support;
   (ii) at least three elongate strands carried by respective first ends thereof on the hook; and
   (iii) at least three fasteners carried on a respective end of the three strands, each of the fasteners including an enlarged head having at least two independent yieldable members, wherein the fasteners are moveable between a compressed state where the fasteners are capable of passing through respective ones of the openings and an expanded state where the fasteners interfere with respective ones of the openings to prevent withdrawal therefrom.

8. The container assembly according to claim 1, wherein the at least two independent yieldable members extend outwardly at an angle to define an arrow-shaped head.

9. The container assembly according to claim 7, wherein the rim includes a plurality of reinforcing walls formed on an underside of the rim adjacent to each of the respective openings.

10. The container assembly according to claim 9, wherein at least two of the plurality of reinforcing walls adjacent to each respective opening extend perpendicular to and between an inside edge and an outside edge of the rim, and wherein at least two of the plurality of reinforcing walls adjacent to each respective opening extend parallel to and between the inside edge and the outside edge of the rim.

11. The container assembly according to claim 7, wherein each of the respective fasteners further include a cover for covering a respective opening, the cover being positioned at a height above the head substantially equal to a thickness of the rim so as to allow the fastener to engage the rim and maintain the head in contact with an underside of the rim.

12. A container assembly, comprising:
(a) a pot having a sidewall, a bottom wall, and an open top defined by an upper rim of the sidewall, the rim having an inside edge, an outside edge, and a plurality of reinforcing walls on an underside of the rim between the inside edge and outside edge;
(b) at least three spaced-apart rectangular openings formed in the rim, the reinforcing walls forming a box around each of the respective openings for adding strength and preventing the openings from deforming; and
(c) a hanger for suspending the pot from a support, the hanger comprising:
   (i) a hook for attachment to the support;
   (ii) at least three elongate strands carried by respective first ends thereof on the hook; and
   (iii) at least three fasteners carried on a respective end of the three strands, each of the fasteners including an arrow-shaped head for being received by means of an interference fit in a respective ones of the openings and a cover for, whereby the hanger suspends the pot from the support.

13. The container assembly according to claim 12, wherein each of the respective fasteners further include a cover for covering a respective opening, the cover being positioned at a height above the head substantially equal to a thickness of the rim for allowing the fastener to engage the rim.

14. The container assembly according to claim 12, wherein at least two of the reinforcing walls forming the box around each respective opening extend perpendicular to the inside edge and the outside edge of the rim.

* * * * *